(12) United States Patent
Sandberg

(10) Patent No.: US 7,204,351 B2
(45) Date of Patent: Apr. 17, 2007

(54) BRAKE GEAR FOR A DISC BRAKE

(75) Inventor: Stefan Sandberg, Lomma (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 11/152,219

(22) Filed: Jun. 14, 2005

(65) Prior Publication Data
US 2005/0284709 A1 Dec. 29, 2005

Related U.S. Application Data (63) Continuation of application No. PCT/EP2003/014499, filed on Dec. 18, 2003.

(51) Int. Cl.
F16D 65/56 (2006.01)

(52) U.S. Cl. .................. 188/71.9; 188/196 V (58) Field of Classification Search ...... 188/71.7–71.9, 188/72.7–72.9
See application file for complete search history.

(56) References Cited

U.S. PATENT DOCUMENTS

| 3,032,144 A | * | 5/1962 | Stanton | 188/71.8 |
| 3,497,036 A | * | 2/1970 | Seip | 188/71.8 |
| 4,355,708 A | | 10/1982 | Papagni | 188/196 |
| 4,406,352 A | * | 9/1983 | Scott et al. | 188/72.8 |
| 4,529,067 A | * | 7/1985 | Scott | 188/72.8 |
| 5,076,401 A | * | 12/1991 | Ta et al. | 188/72.9 |
| 5,123,505 A | | 6/1992 | Antony | 188/71.9 |
| 5,205,382 A | * | 4/1993 | Edmisten | 188/71.8 |
| 5,219,046 A | * | 6/1993 | Clark | 188/71.8 |
| 5,358,078 A | * | 10/1994 | Gajek et al. | 188/71.8 |
| 5,558,185 A | | 9/1996 | Tribuzio et al. | 188/72.6 |
| 5,788,022 A | | 8/1998 | Antony | 188/71.8 |

FOREIGN PATENT DOCUMENTS

| DE | 23 32 394 | 1/1975 |
| DE | 43 23 292 | 1/1995 |
| EP | 02/71864 | 6/1988 |
| EP | 05/53105 | 8/1993 |
| EP | 06/98749 | 2/1996 |
| EP | 1 160 479 | 5/2001 |
| WO | 01/75324 | 10/2001 |

OTHER PUBLICATIONS

International Search Report, Apr. 15, 2004.

* cited by examiner

*Primary Examiner*—Thomas Williams
(74) *Attorney, Agent, or Firm*—St. Onge Steward Johnston & Reens LLC (57) ABSTRACT

The invention relates to a brake gear for a disc brake serving to transfer a force to a brake pad that acts upon a brake disc. The brake gear is accommodated in a brake caliper of the disc brake and comprises both a pressing element, which interacts with the brake caliper, as well as a rod. The pressing element is mounted in the housing of the brake caliper with the aid of the rod in such a manner that it is parallel to the rotation axis of the brake disc.

10 Claims, 6 Drawing Sheets

BRAKE GEAR FOR A DISC BRAKE

This application is a continuation of pending International Patent Application No. PCT/EP2003/014499 filed Dec. 18, 2003 which designates the United States and claims priority of German Patent Application No. 102 60 597.1 filed Dec. 23, 2002.

FIELD OF THE INVENTION

The present invention relates to a brake mechanism for a disk brake to create and transmit a clamping force by way of a brake pad to a brake disk.

From existing technology there are several known elements for brake mechanisms for disk brakes, which are relatively compact, stable, and reliable and can be produced in mass quantities especially for heavy trucks.

For instance, EP 0271864 B1 describes an activation device in which an axial activation member is positioned in a brake caliper housing around which several components of the brake mechanism are arranged. The adjustment device provided for this and the applied reinforcing mechanism in the form of a roller-ramp appliance include a number of individual components which make installation difficult and therefore prove costly. In addition, in connection with the installation of the brake caliper used with this disk brake, it is necessary, both on the rear side of the brake caliper housing and on the side toward the brake disk, to provide many apertures which, however, involve extensive insulation problems.

In addition, EP 0553105 B1 describes a brake mechanism which includes a gear mechanism to transmit the clamping force. Although this brake mechanism is less complex than the aforementioned model, its installation in the brake caliper housing proves difficult because during the assembly inside the housing a pivot connection must be established and maintained between a contact piece and the gear by means of a roller body that must be arranged between these. In addition the brake mechanism produced in this manner can be inserted only from the rear of the brake caliper, requiring a somewhat large aperture in the rear part of the brake caliper housing or even a two-part brake caliper with a divider included, which inevitably raises considerable insulation problems. In addition, as a consequence of the exclusively pivoting connection between the gear and the contact piece, the contact piece, lacking the extra required kinematic degree of freedom, engages the brake shoe at a slight inclination, so that uneven wearing occurs on the brake pad.

To avoid the aforementioned problem, it is proposed in the known technology, for instance in EP 0698749 B1, to make available with a gear-activated brake mechanism, such as additional degree of freedom so that a strictly axial linear arrangement of the contact piece becomes possible. The brake mechanism presented in this publication is introduced during installation both from the brake disk side and from the side of the brake caliper turned away from the brake disk, and is assembled inside the brake caliper, which again involves insulation problems as a result of the numerous apertures. In addition, this type of installation proves complex and therefore costly.

WO 01 75324 describes a brake mechanism in which the contact element for transmitting the clamping force is arranged around a center rod. In the presented configuration of the brake mechanism, however, a number of individual components are used, which must interact in complex ways. In this connection, the installation of the individual components proves especially time consuming and thus costly.

This description of existing technology shows the need to find solve the various associated problems and disadvantages as simultaneously as possible.

It is therefore the object of the present invention to provide a brake mechanism that relies on fewer components and that proves less complex than the devices known in existing technology. This is intended to include less of a space requirement and reduced weight. In addition, the brake mechanism should be distinguished by improved stability and, because it is built into a brake caliper housing, by improved insulation. An additional object consists in providing a brake mechanism that is easily installed and whose individual components can be produced easily and cost-effectively.

This object is fulfilled through a braking mechanism for a disk brake for transmitting a force onto a brake block which acts on a brake disk, where the brake mechanism is engaged in a brake caliper of the disk brake and includes a contact element interacting with the brake block and a rod, characterized in that the contact element is installed in the housing of the brake caliper parallel to the rotational axis of the brake disk with the help of the rod.

An essential advantage of the invention consists in the fact that the rod that runs through the contact element serves as the means of installing this contact element in the housing of the brake caliper, so that the rod and thus the contact element surrounding it are positioned parallel to a rotation axis of the brake disk.

For this purpose the rod is configured in such a way that it can be secured axially in the housing of the brake caliper.

In one embodiment the contact element on the brake disk side has a hollow inner section into which the rod extends.

According to the invention, the rod interacts with a reset device which returns the brake mechanism to the starting position if there is no longer a clamping force acting on the brake disk. Thus one advantageous configuration of the brake mechanism provides that the reset device, preferably a coil spring activated by pressure, is positioned in the hollow inner section of the contact element between the brake-disk end of the rod and the contact element.

Alternatively it is also conceivable that the reset device is positioned inside the brake caliper housing in such a way that this device operates either between the housing of the brake caliper and the contact element, or between the housing of the brake caliper and the reinforcing mechanism acting directly or indirectly on the contact element.

In another embodiment of the brake mechanism according to the invention, the contact element is at least of two-part construction and includes a sliding sleeve and an adjusting screw that are linked together by a threaded connection.

The adjusting screw serves to compensate for wearing of the brake linings caused by the locking.

There are essentially two possible arrangements for the construction of the contact element according to the invention.

In one embodiment the sliding sleeve is in line with an aperture of the brake caliper housing and has an inner thread with which an outer thread of the adjusting screw is screwed rotatably. To allow relative movement of the sliding sleeve during the adjustment process, the sliding sleeve is controlled in the brake caliper so that it cannot be rotated.

In another embodiment the adjusting screw is rotatably controlled in an aperture of the brake caliper housing and has an inner thread with which an outer thread of the sliding sleeve connects, so that the sliding sleeve must also be kept secure against rotation, which can be achieved for instance through the direct or indirect coupling of the sliding sleeve with the brake block or brake lining carrier.

In both embodiments the adjusting screw on the brake disk side has the hollow inner section into which the rod extends and into which the reset device can be positioned, so that in both cases the sliding sleeve extends beyond this hollow inner section.

In the foregoing preferred embodiments the sliding sleeve and adjusting screw components are mounted so that they rotate axially around the rod. To obtain an optimal control and positioning of the individual components in the brake caliper, the rod is positioned so that it can rotate in the brake caliper housing, preferably in the rear area of the housing.

The rod in this case is in a mutually non-rotatable connection with the adjusting screw, which however allows linear sliding of the adjusting screw on the rod. In other words the rod serves as a rotatable mounting for the adjusting screw.

In another embodiment of the brake mechanism, in addition, an adjustment device is provided which powers the adjusting screw for the purpose of replacement. The adjustment device and its individual components can either be configures likewise as axially symmetrical and thus placed around the rod, or they can be situated separately on the brake caliper housing and connected with the adjusting screw.

The structure of the contact element consisting of the sliding sleeve and adjusting screw and possibly of the adjustment device as axially symmetrical components can easily be processed mechanically and therefore are less costly to produce. In addition, because of the primarily axially symmetrical structure, altogether a more compact and thus more stable brake mechanism is created, which first is marked by a shortened structural length in the axial direction to the brake disk and second, for its control and its installation in the housing, also requires only an aperture that is axially symmetrical in configuration and which is easily processed and simple to produce by casting and allows simple insulation.

In an additional embodiment of the brake mechanism according to the invention, the rod is configured so that it axially, that is with respect to the brake disk, grasps and secures the reinforcement mechanism, which acts on the adjustment device and/or the adjusting screw and/or the contact element when the brake is activated. Parts at least of the reinforcing mechanism can also be produced as axially symmetrical.

The reset device provided inside the hollow inner section of the contact element or of the adjusting screw is, in one embodiment according to the invention, also capable of exerting a definite force on the adjusting screw while forming a borderline torque, so that as a result any inadvertent vibration-induced rotation of the adjusting screw is prevented.

Because, according to the invention, the rod is configured as a shaft mounted rotatably in the housing of the brake caliper and is connected securely against rotation by the adjusting screw with the contact element, in a simple manner it becomes possible to manually adjust the entire brake mechanism after installation in the brake caliper, in that it is possible for this purpose to directly or indirectly attack at least one of the ends of the rod which is free.

In another advantageous embodiment of the invention, the end of the sliding sleeve pointing toward the brake disk and interacting with the brake block or the brake lining carrier is completely closed, so that most of the brake mechanism, especially the hollow inner section of the adjusting screw of the contact element, can already be protected from soiling. Between the contact element and the brake caliper housing, therefore, just one simple, preferably ring-shaped insulating means must be provided.

In an adaptation of the invention the rod is configured in such a way that it is capable of holding together the contact element with the sliding sleeve and the adjusting screw and/or the reset device and/or the adjustment device and/or the reinforcing mechanism as a self-sufficient unit. Depending on the configuration, this allows on the one hand the joint construction as a pre-assembled unit and its subsequent insertion into the brake caliper housing or, on the other hand, the pre-assembly of individual components and their subsequent joint construction inside the brake caliper, so that depending on the circumstances the building components or individual parts can be inserted through apertures provide din both sides of the brake caliper.

The centrally positioned rod according to the invention is capable of fulfilling several functions.

On the one hand it serves as an installation tool and an essential element for the self-sufficient unit, and on the other hand it is the means for securing this unit inside the brake caliper housing. In addition it serves as a rotation bearing axle around which the rotary components of the brake mechanism can rotate.

Because, in one embodiment, the rod is in direct connection with the adjusting screw of the adjustment device, a wear detection sensor of any desired construction type can act directly or indirectly on these and is capable of determining the wear of the brake lining by means of the particular manner of rotation of the adjusting screw.

An essential advantage of the brake mechanism in each of the previously described embodiments according to the invention consists in the diverse ways in which it can be used.

Thus, it can be built into disk brakes of both the fixed-caliper and the floating-caliper type. Because of its compact configuration it can be used both for one-part and for multiple-part brake calipers. The use of the centrally positioned rod is essentially independent of the concretely used configuration of the reinforcing mechanism and of the realization of the adjustment device. Thus, electrical, pneumatic, or hydraulic activation means can be provided for the purpose of driving the reinforcing mechanism. This mechanism itself can include a gear with eccentrically arranged transmission section, a roller-ramp mechanism, a wedge arrangement, or the like.

As such, the brake mechanism according to the invention can be provided as a single component in the brake caliper housing, so that under some circumstances it includes a means of uniformly distributing the clamping force on the contact element, or there can be two brake mechanisms of this kind arranged parallel in the brake caliper housing, which simultaneously act on the brake block so that in some cases the adjustment device of these can be coupled in the brake mechanisms by means of a synchronization means.

Additional advantages and embodiments of the brake mechanism according to the invention can be seen from the embodiments that are described with reference to illustrations are not intended to be restrictive.

DETAILED DESCRIPTION OF PREFERRED EMBODIMENTS

Figure 1:
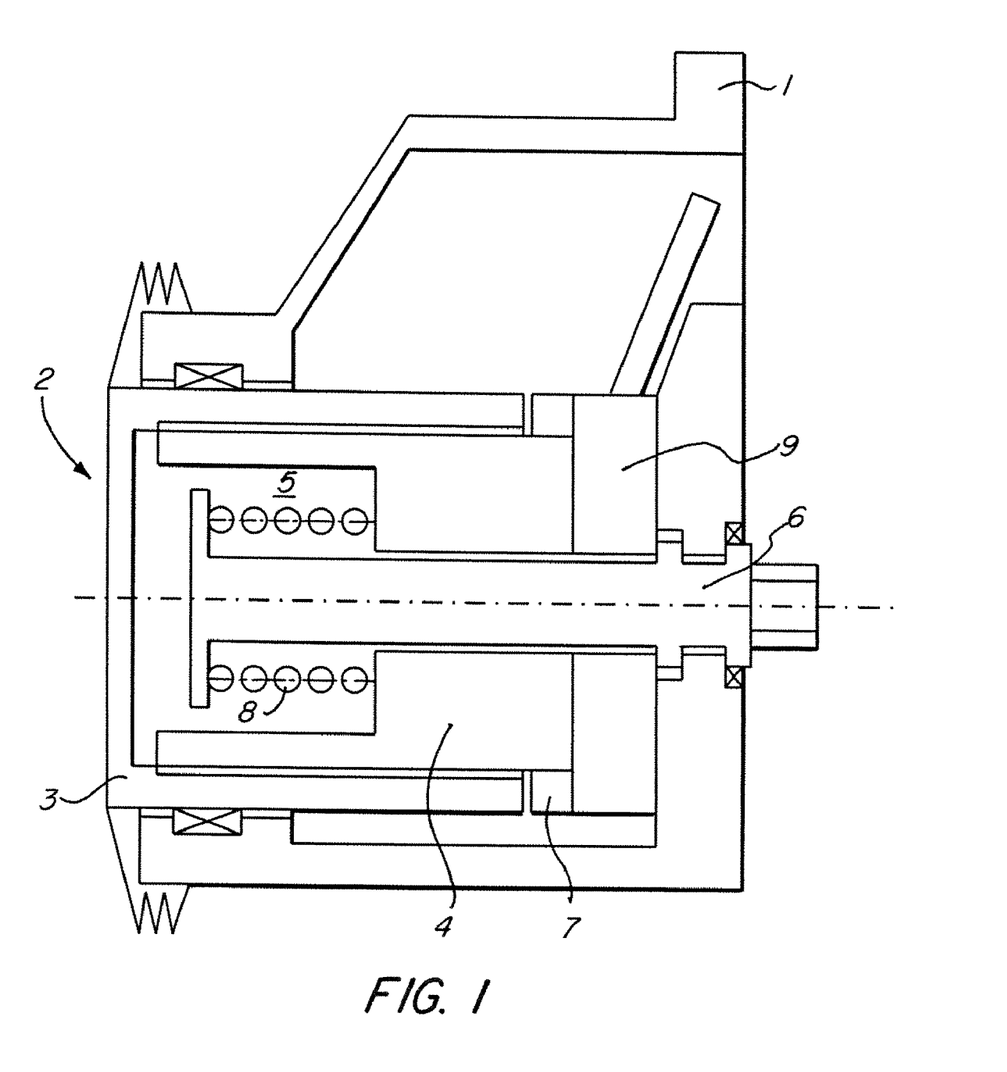
FIG. 1 shows a schematic view of the brake mechanism according to the invention with its essential main components.

FIG. 1 shows schematically the basic structure of the brake mechanism that is the basis of the invention. The components shown in FIG. 1 are presented only in theoretical depictions.

The brake mechanism according to the invention is contained in a housing of a brake caliper 1. The brake mechanism includes essentially a contact element 2, which can move axially as far as the brake disk (not illustrated) and interacts with a brake block (also not illustrated) or brake lining carrier in order to transmit the clamping force.

In the embodiment shown in FIG. 1 the contact element 2 consists of an exterior sliding sleeve 3, which is guided not in rotary manner but rather linearly in the housing of the brake caliper 1. In addition the contact element 2 has an adjusting screw 4, which is positioned inside the sliding sleeve 3, and is connected by a threaded link with it. The adjusting screw 4 has an inner hollow section 5 at its end that is turned toward the brake disk.

The sliding sleeve 3 and the adjusting screw 4 are configured as axially symmetrical.

The adjusting screw 4 of the contact element 2 has a rod 6 running through it, which ends at the hollow inner section 5. The rod 6 is axially positioned in the housing of the brake caliper 1, in its rear area.

The adjusting screw 4 is activated by an adjustment device 7, which is also configured as axially symmetrical in the embodiment shown in FIG. 1 and has the rod 6 running through it. The rod 6 itself is positioned rotatably in the housing of the brake caliper 1 and is in rotation-proof connection with the adjusting screw 4.

To compensate for the vacant space between the brake lining and the brake disk that has been enlarged by wearing of the brake disk, the adjustment device 7 is activated in order to set the adjusting screw 4 in rotation so that the contact element 2 slides axially in the direction toward the brake disk to compensate for this additional vacant space before the actual clamping occurs during braking.

The rod 6 interacts with a reset device 8, which in this embodiment of the brake mechanism is positioned in the hollow inner section 5 of the contact element 2 and acts on the adjusting screw 4.

To transmit the clamping force, the contact element 2 is activated by a reinforcing mechanism 9, which also has the rod 6 running through it. The reinforcing mechanism 9 serves to strengthen a force applied from without, for instance from a hydraulic or pneumatic cylinder.

In the embodiment according to the invention the rod 6 holds together the contact element 2 with the sliding sleeve 3 and the adjusting screw 4, the adjustment device 7, the reset device 8, and the reinforcing mechanism 9 as one unit in axial direction in the housing of the brake caliper 1.

Figure 2:
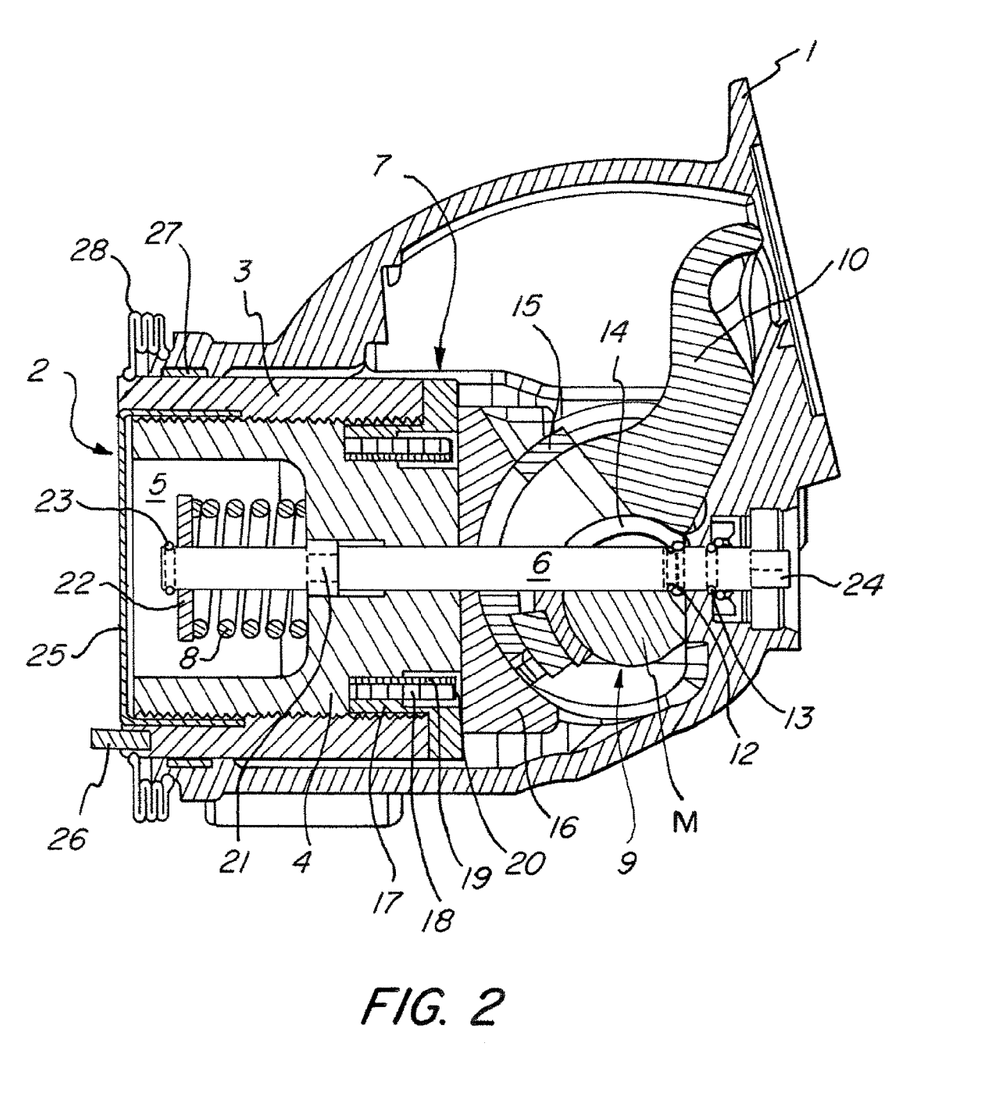
FIG. 2 shows the brake mechanism in a particularly preferred embodiment according to the invention.

FIG. 2 shows the schematic principle of the brake mechanism presented in FIG. 1, now in a concrete preferred embodiment.

The self-sufficient unit consisting of the contact element 2, the adjustment device 7, the reset device 8, and the reinforcing mechanism 9 is held together by the rod 6, which is rotatably positioned in the rear area of the one-part housing of the brake caliper 1.

The reinforcing mechanism 9 includes a gear 10, on which an activation cylinder (not illustrated) strikes through an aperture in the brake caliper 1 to apply a force. The gear 10 can swivel around a cylindrical roller body 11, which has the rod 6 running through it and is secured immovably by means of a securing ring 12 axially on the rod 6, so that the roller body is supported flatly on the rear wall of the brake caliper 1.

The rod 6 itself is axially and rotatably secured in the housing of the brake caliper 1, first through the securing ring 12 and second by a securing ring 13 situated externally on the rear wall opposite this securing ring 12.

The gear 10 in its lower section with a concave mounting surface is in contact with the roller body 11 by means of a first radial segment bearing 14.

With its opposite convex mounting surface, the gear 10 is in connection with a transmission element 16 by way of a second radial segment bearing 15.

The lower end of the gear 10 is configured so that a reinforcement of the introduced force can be achieved in that the gear 10 moves between the two radial segment bearings 14 and 15 and thereby pushes the contact element 2 in the direction of the brake disk.

The gear 10 and the radial segment bearings 14 and 15 have a slit opening through which the rod 6 extends. In the same way the roller body 11 and the transmission element 16 are provided with a bore hole for inserting the rod 6.

The transmission element 16 is in direct connection with the adjustment device 7 and the adjusting screw 4 of the contact element 2.

The adjustment device 7 consists of several axially symmetrical components, an adjustment ring 17, a torque-limiting spring 18, a locking spring 19 acting only in one rotation direction, and a housing ring 20. A stud (not illustrated) extends from the convex mounting surface of the gear 10 and engages in a groove situated externally on the adjustment ring 17 (not illustrated) and, through the swivel motion of the gear 10, sets the adjustment ring 17 in motion. By means of the torque-limiting spring 18 and the housing ring 20, this rotation is transmitted to the locking spring 19 and thus to the adjustment screw 4 until the contact element 2 grips the brake disk with the brake block (not illustrated) brake lining carrier. At this time the torque-limiting spring 18 slips and the transmission element 16 can completely transmit the power onto the contact element 2.

The adjusting screw 4 rotates during replacement with the rod 6.

For this purpose the screw is in a rotation-proof connection with the rod 6, a connection that is produced by an outer hexagon 21 which is received in a corresponding guide groove that is configured with an inside hexagon, which during the actual tensing allows the adjustment screw 4 to glide on the outside hexagon 21 and thus on the rod 6.

The reset device 8 in the form of a bolt spring activated by pressure is situated between the adjustment screw 4 and the rod 6. For this purpose an abutment plate 22 is secured on the brake disk end of the rod 6 for the bolt spring 8 by means of an insulating ring 23. The spring force of the reset device 8 is selected here so that it allows automatic resetting of the entire unit on the one hand, after no more clamping force is exerted, and on the other hand in the rest position it exerts such power on the adjusting screw 4 that this screw cannot be inadvertently set in rotation, for instance as a result of vibrations. In other words, the spring 8 functions in this context also as protection against vibration for the adjustment screw 4.

The end 24 of the rod 6 placed opposite the bake disk is exposed in a recess in the rear wall section of the brake caliper 1 and is configured in such a way that, by means of a tool, it allows manual adjustment of the entire unit by the connection that transmits the rotation between the rod 6 and the adjusting screw 4.

The contact element 2 on its side directed toward the brake disk is closed off with a lid 25 so that the internal hollow section 5 is protected against soiling from outside. The sliding sleeve 3 of the contact element 2 is connected with the brake block by a stud 26 and thereby remains locked against rotation, so that the sliding sleeve 3 can move in an axially symmetrical bore hole of the brake caliper 1 only by sliding in a linear direction.

Between the sliding sleeve 2 and the brake caliper 1 there is an O-ring 27 on the inside for purposes of insulation. In addition, on the outside between the sliding sleeve 3 and the brake caliper 1, there is an insulating means 28 in the form of a bellows.

It is recognized that, through the use of primarily axially symmetrical components, which are held together by the rod 6 inside the brake caliper 1 and are installed in the caliper, an extremely compact and self-sufficient brake mechanism can be created.

The brake mechanism shown in FIG. 2, however, is not restricted to this embodiment. Rather, further variants on the inventive principle are possible.

Figure 3:
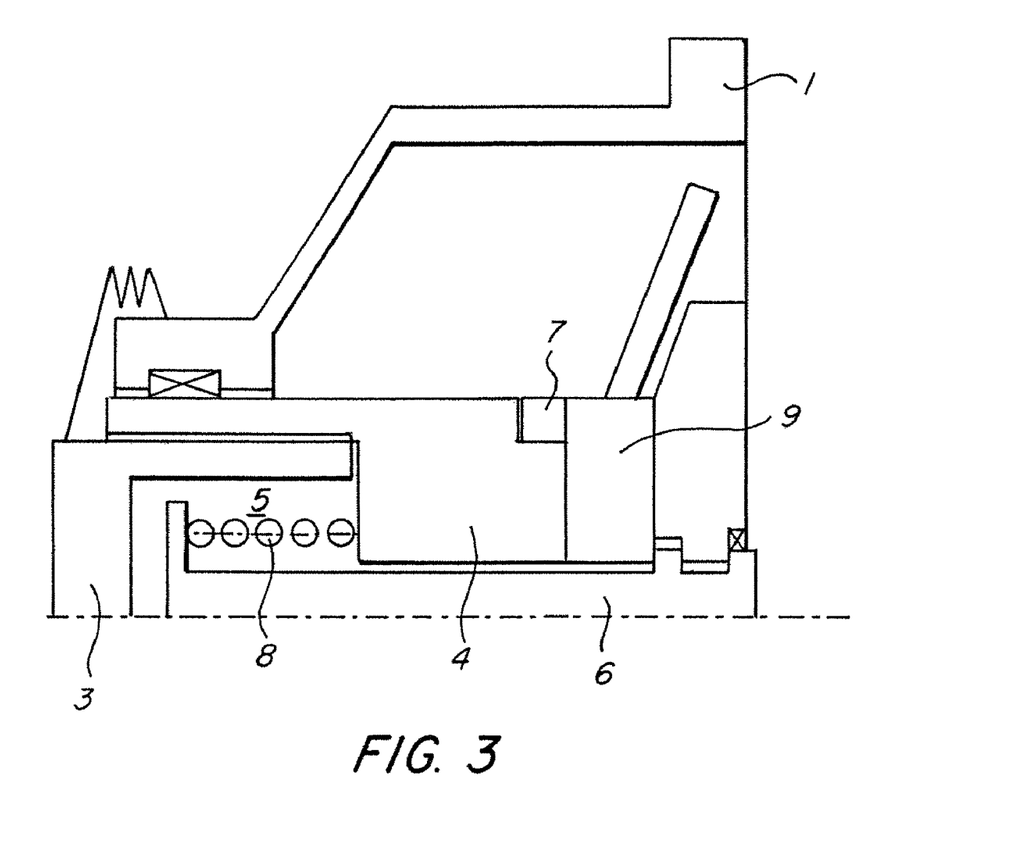
FIG. 3 shows schematically an additional embodiment of the brake mechanism with an external adjusting screw.

Thus, in FIG. 3, we see an additional embodiment of the brake mechanism, in which the adjusting screw 4 is guided rotatably in the housing of the brake caliper 1, and where the sliding sleeve 3 is located inside the adjusting screw 3. The adjustment device 7 functions on the same principle as the embodiment shown in FIGS. 1 and 2.

Figure 4:
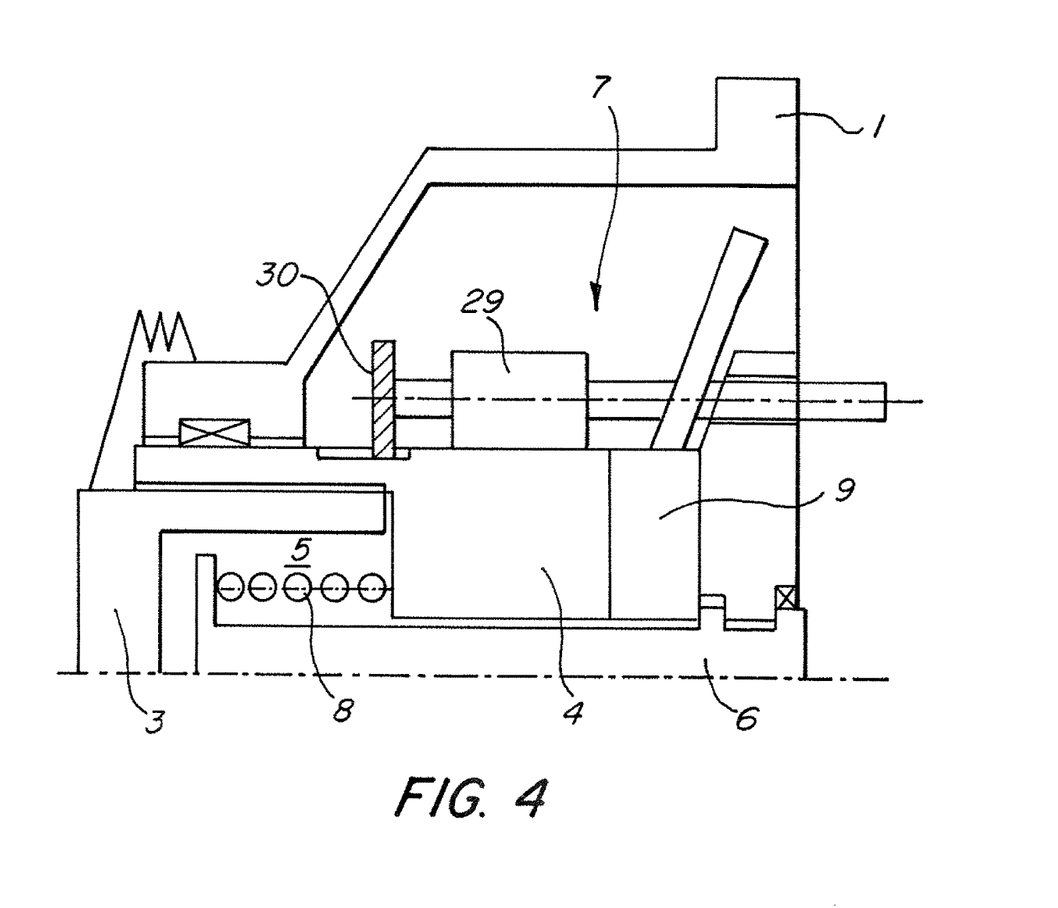
FIG. 4 shows schematically an embodiment of the brake mechanism with an external adjusting screw in connection with a separately mounted adjustment device.

An alternative to an adjustment device 7, which is not positioned axially symmetrically around the rod 6, is seen in FIG. 4. This adjustment device 7 includes a positioning element 29, such as a positioning motor, and a gear wheel 30, which interlocks by a threading with the adjusting screw 4 in order to set this wheel in motion accordingly.

In the embodiment shown in FIG. 4 the adjusting screw 4, as in FIG. 3, is positioned around the sliding sleeve 3 and is controlled in the brake caliper 1. The embodiment according to FIG. 1 is also possible, whereby the sliding sleeve 3 does not extend over the entire length of the adjusting screw 4, as is shown in FIG. 5, so that a threaded connection with the gear wheel 30 is possible.

Figure 5:
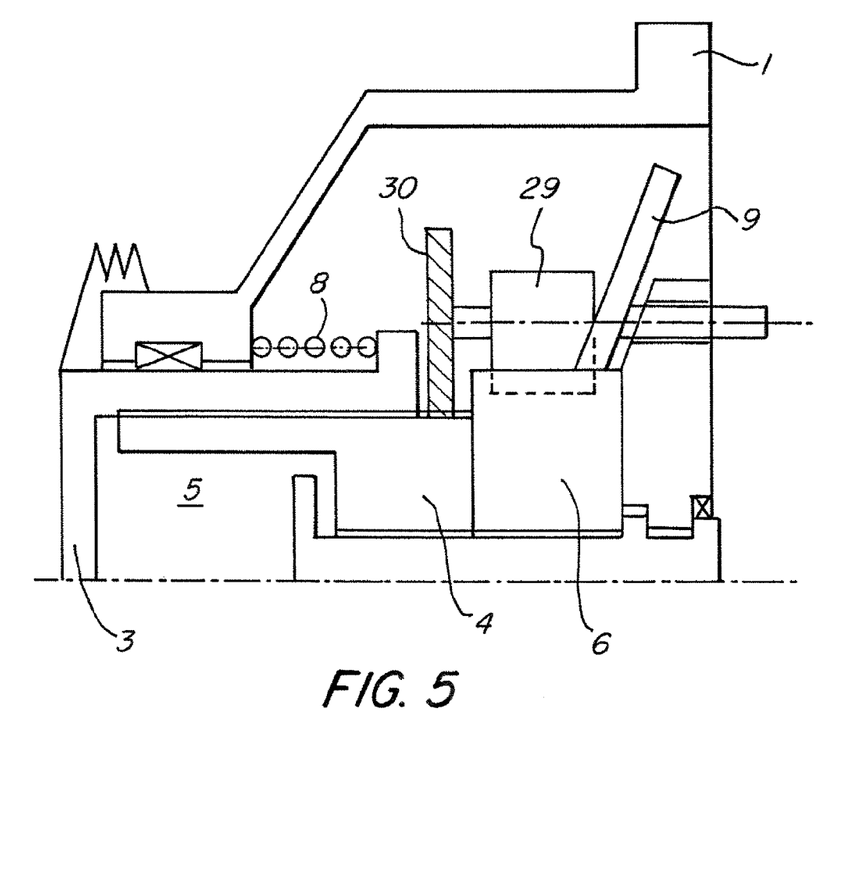
FIG. 5 shows schematically an embodiment of the brake mechanism with an interior adjusting screw in connection with a separately mounted adjustment device.
Figure 6:
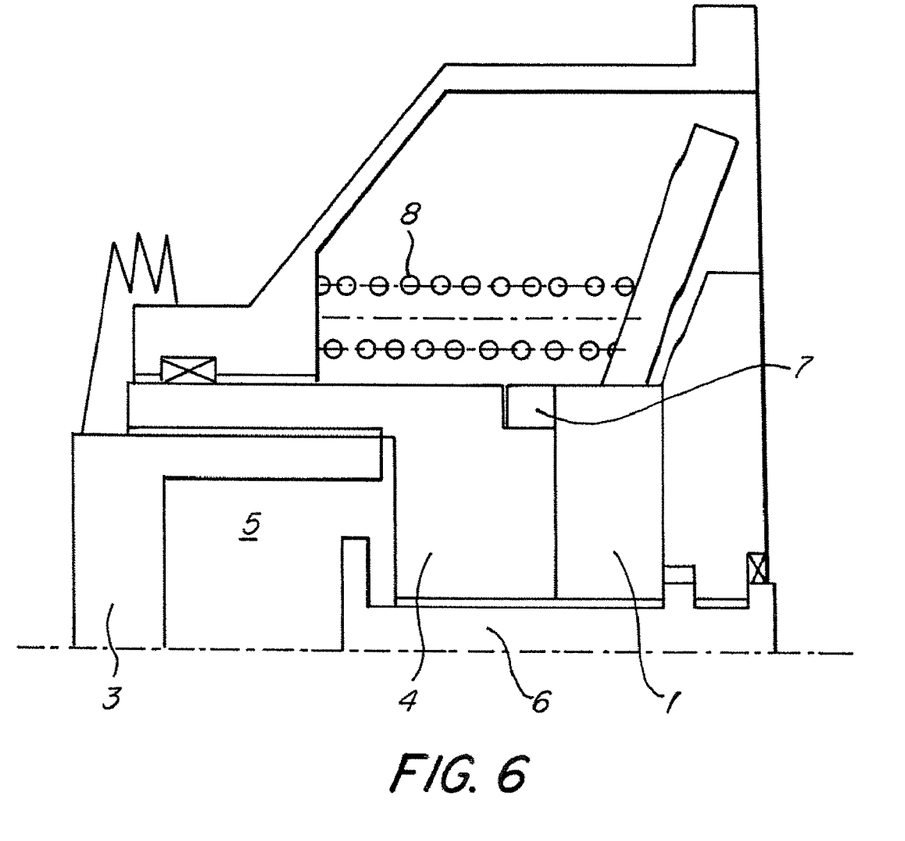
FIG. 6 shows schematically an additional embodiment of the brake mechanism with a reset device mounted between the brake caliper and the reinforcing mechanism.

In the embodiment according to FIG. 5 the reset device 8 is located between the brake caliper 1 and the pressure element 2, or the sliding sleeve 3. It is also possible, however, that, as shown in FIG. 6, the reset device 8 is situated between the brake caliper 1 and the reinforcing mechanism 9.

What is claimed is:

1. A braking mechanism for a mechanical disk brake for transmitting a force onto a brake block which acts on a brake disk, where the brake mechanism is engaged in a brake caliper of the disk brake and includes a contact element interacting with the brake block and a rod with an end that faces the brake disk, characterized in that the contact element is installed in the housing of the brake caliper parallel to the rotational axis of the brake disk with the help of the rod;

wherein the contact element has a hollow inner section facing the brake disk into which the rod extends;

wherein the rod interacts with a reset device for the brake mechanism;

wherein the reset device is positioned inside the hollow inner section of the contact element on the rod and between the contact element and the end of the rod facing the brake disk;

wherein the contact element includes a sliding sleeve and an adjusting screw which are linked to one another in a threaded connection.

2. A braking mechanism according claim 1, characterized in that the reset device, by forming a torque limit, exerts a predetermined force on the adjusting screw preventing inadvertent rotation.

3. A braking mechanism according to claim 1, characterized in that the rod holds together the contact element and/or the reset device and/or an adjustment device and/or a reinforcing mechanism as a self-sufficient unit.

4. A braking mechanism according to claim 1, characterized in that the rod is situated rotatably in the housing of the brake caliper.

5. A braking mechanism according to claim 1, characterized in that the rod is configured so that at least one of its ends makes manual adjustment possible.

6. A braking mechanism according to claim 1, characterized in that the sliding sleeve and the adjusting screw are positioned axially symmetrically around the rod so that the sliding sleeve is controlled against rotating and the adjusting screw is connected with the rod so that it cannot rotate and can slide.

7. A braking mechanism according to claim 1, characterized in that an adjustment device is provided which interacts with the adjusting screw.

8. A braking mechanism according to claim 7, characterized in that a reinforcing mechanism is provided which interacts with the adjustment device and/or the contact element.

9. A braking mechanism according to claim 1, characterized in that the contact element is sealed on its end turned toward the brake disk and that between the contact element and the housing of the brake caliper there is at least one insulating means.

10. A braking mechanism for a mechanical disk brake for transmitting a force onto a brake block which acts on a brake disk, where the brake mechanism is engaged in a brake caliper of the disk brake and includes a contact element interacting with the brake block and a rod with an end that faces the brake disk, characterized in that the contact element is installed in the housing of the brake caliper parallel to the rotational axis of the brake disk with the help of the rod;

wherein the contact element has a hollow inner section facing the brake disk into which the rod extends;

wherein the rod interacts with a reset device for the brake mechanism;

wherein the reset device is positioned inside the hollow inner section of the contact element on the rod and between the contact element and the end of the rod facing the brake disk;

wherein the reset device, by forming a torque limit, exerts a predetermined force on an adjusting screw preventing inadvertent rotation.

* * * * *